US009191991B2

(12) United States Patent
Smadi et al.

(10) Patent No.: US 9,191,991 B2
(45) Date of Patent: Nov. 17, 2015

(54) METHODS AND APPARATUS FOR REDUCING THE IMPACT OF RF INTERFERENCE BASED ON ESTIMATION OF COLORED NOISE

(71) Applicant: Research In Motion Limited, Waterloo (CA)

(72) Inventors: Mohammed Nawaf Smadi, Waterloo (CA); Ernst Slawomir Zielinski, Bochum (DE); Mohamed Darwish A. Mohamed, Waterloo (CA); Holger Wirz, Bochum (DE); Vytautas Robertas Kezys, Waterloo (CA)

(73) Assignee: BlackBerry Limited, Waterloo (CA)

( * ) Notice: Subject to any disclaimer, the term of this patent is extended or adjusted under 35 U.S.C. 154(b) by 165 days.

(21) Appl. No.: 13/778,532

(22) Filed: Feb. 27, 2013

(65) Prior Publication Data

US 2014/0243042 A1    Aug. 28, 2014

(51) Int. Cl.
*H04M 1/00* (2006.01)
*H04W 88/06* (2009.01)
*H04W 16/14* (2009.01)
*H04L 1/00* (2006.01)

(52) U.S. Cl.
CPC .............. *H04W 88/06* (2013.01); *H04L 1/00* (2013.01); *H04W 16/14* (2013.01)

(58) Field of Classification Search
CPC ....... H01Q 1/246; H04W 16/10; H04W 16/28
USPC ........................................ 455/63.1
See application file for complete search history.

(56) References Cited

U.S. PATENT DOCUMENTS

2003/0231721 A1*  12/2003  Rouphael et al. ............ 375/341
2005/0141466 A1*   6/2005  Krupka ........................ 370/338
2005/0143011 A1    6/2005  Jacobsen
(Continued)

FOREIGN PATENT DOCUMENTS

EP      1589781    10/2005
WO   2006053951     5/2006
(Continued)

OTHER PUBLICATIONS

Extended European Search Report for EP 13157038, Jun. 13, 2013.

*Primary Examiner* — Khalid Shaheed
*Assistant Examiner* — Ernest Tacsik
(74) *Attorney, Agent, or Firm* — Integral Intellectual Property Inc.; Miriam Paton; Amy Scouten

(57) ABSTRACT

A mobile device having first and second RF transceivers performs a communication function in accordance with a communication protocol of the second RF transceiver. During performance of this function, the mobile device estimates the RF interference on a channel of the first RF transceiver, and stores parameters which characterize the estimated RF interference in association with an identifier corresponding to the function. These actions are repeated for a plurality of channels of the first RF transceiver, as well as for a plurality of different communication functions. When performing a communication function again, the mobile device receives an identifier corresponding to the function and retrieves stored parameters corresponding to the received identifier. The mobile device applies the retrieved parameters to the first RF transceiver for reducing the adverse effect of RF interference during reception on the channel of the first RF transceiver.

20 Claims, 10 Drawing Sheets

(56) References Cited

U.S. PATENT DOCUMENTS

| | | | |
|---|---|---|---|
| 2005/0250466 A1* | 11/2005 | Varma et al. | 455/296 |
| 2006/0292986 A1 | 12/2006 | Bitran et al. | |
| 2007/0217441 A1* | 9/2007 | Mudulodu et al. | 370/437 |
| 2007/0224936 A1 | 9/2007 | Desai | |
| 2008/0107046 A1 | 5/2008 | Kangasmaa et al. | |
| 2008/0240314 A1* | 10/2008 | Gaal et al. | 375/346 |
| 2009/0270059 A1* | 10/2009 | Bally et al. | 455/277.1 |
| 2010/0029289 A1* | 2/2010 | Love et al. | 455/450 |
| 2010/0273426 A1* | 10/2010 | Walley et al. | 455/63.1 |
| 2010/0304685 A1* | 12/2010 | Wietfeldt et al. | 455/67.11 |
| 2011/0280295 A1* | 11/2011 | Corona et al. | 375/224 |
| 2011/0300805 A1* | 12/2011 | Gaikwad et al. | 455/63.1 |
| 2011/0312288 A1 | 12/2011 | Fu et al. | |
| 2012/0009888 A1 | 1/2012 | Smadi | |
| 2012/0034913 A1 | 2/2012 | Wang et al. | |
| 2012/0040620 A1* | 2/2012 | Fu et al. | 455/63.1 |
| 2012/0044913 A1 | 2/2012 | Smadi | |
| 2012/0087341 A1 | 4/2012 | Jang et al. | |
| 2012/0093009 A1 | 4/2012 | Wang et al. | |

FOREIGN PATENT DOCUMENTS

| | | |
|---|---|---|
| WO | 2012014188 A1 | 2/2012 |
| WO | 2012119373 A1 | 9/2012 |

* cited by examiner

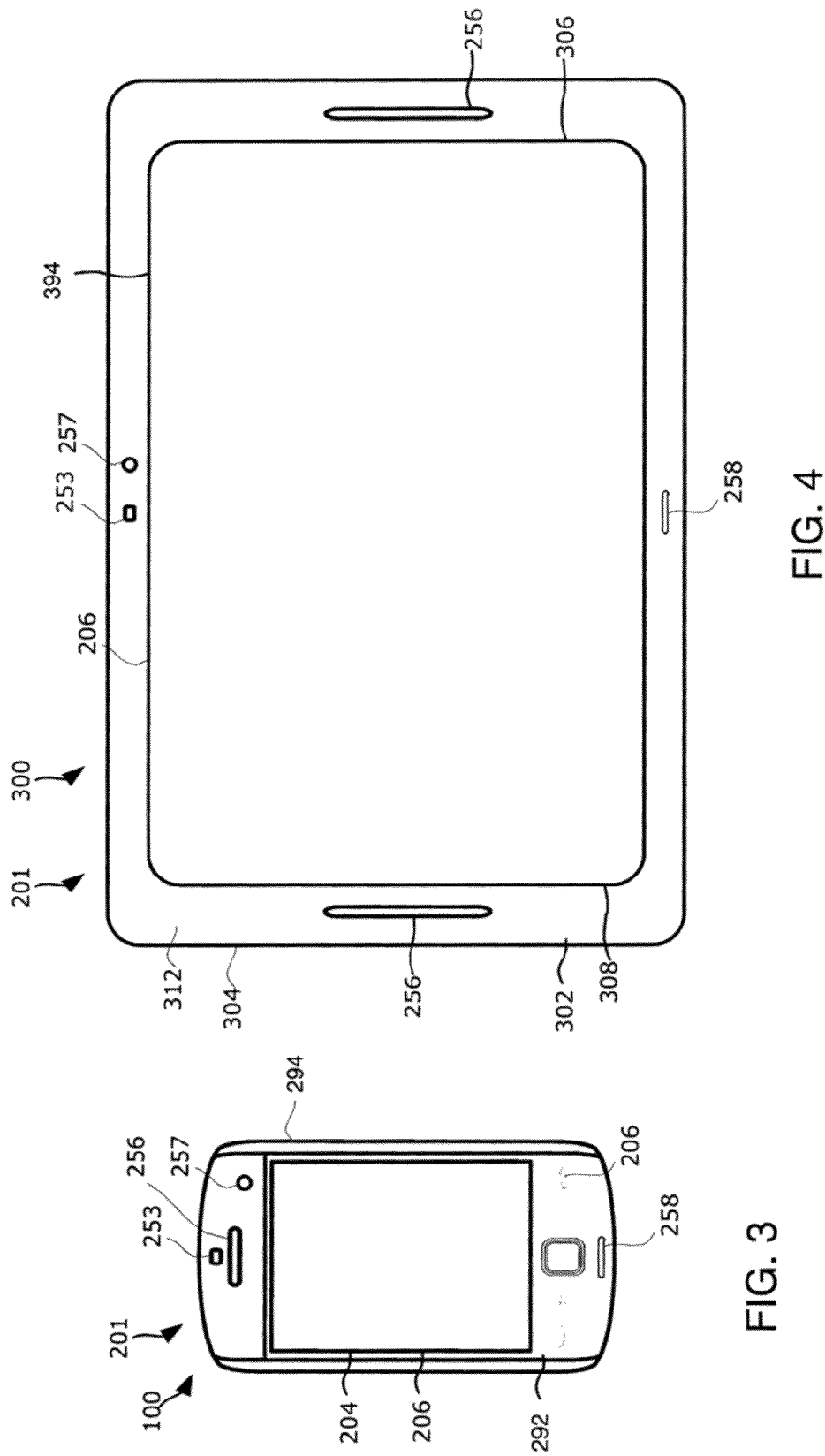

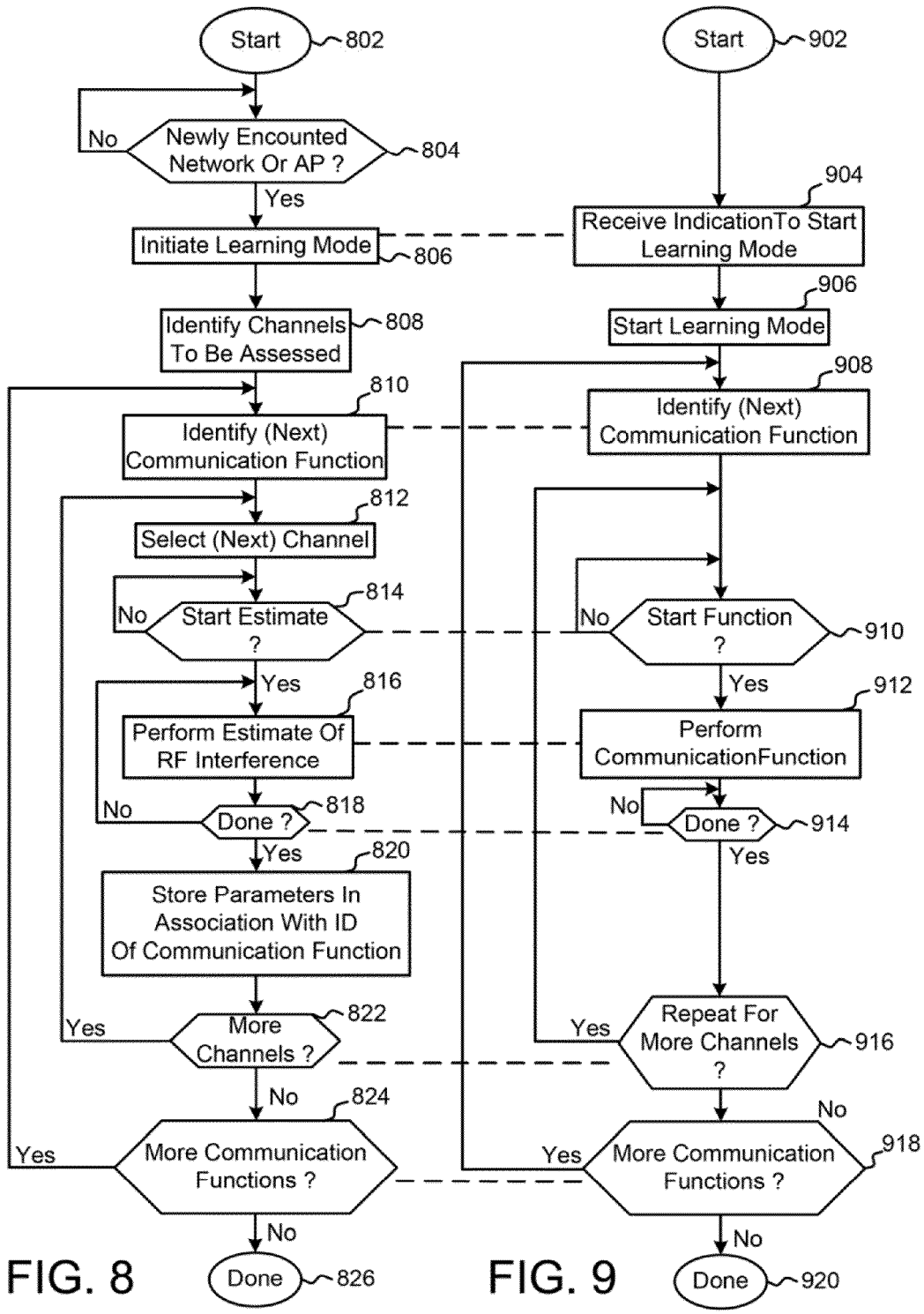

METHODS AND APPARATUS FOR REDUCING THE IMPACT OF RF INTERFERENCE BASED ON ESTIMATION OF COLORED NOISE

BACKGROUND

1. Field of the Technology

The present disclosure relates generally to mobile communication devices configured for radio frequency (RF) communications, and more particularly to techniques for reducing the impact of RF interference in such communications.

2. Description of the Related Art

A mobile communication device, such as a smartphone or cellular telephone, may be configured for radio frequency (RF) communications in a wireless communication network. For example, such a device may communicate via access points (APs) of a wireless local area network (WLAN) in accordance with IEEE 802.11 technology or the like. Such a device may be additionally configured for RF communications with use of a cellular technology, for example, in accordance with Long Term Evolution (LTE®) radio technology. The RF bands assigned for use of these technologies are adjacent one another.

There is a need for ensuring that communications are not hindered due to RF interference from use of co-located radios (e.g. IEEE 802.11 and LTE®radios contained within the same mobile device) in these and similar environments.

BRIEF DESCRIPTION OF THE DRAWINGS

Embodiments of present disclosure will now be described by way of example with reference to attached figures, wherein:

FIGS. 3 and 4 are some examples of different types of mobile devices of the present disclosure, which include a smartphone (FIG. 3) and a tablet computer (FIG. 4);

FIGS. 8 and 9 are flowcharts for describing methods for use in reducing the effect of RF interference using a learning mode of operation, where FIG. 8 corresponds to a method for use with the first RF transceiver and FIG. 9 corresponds to a method for use with the second RF transceiver;

DETAILED DESCRIPTION OF THE PREFERRED EMBODIMENTS

Techniques for reducing the effect or impact of RF interference for a mobile device having first and second RF transceivers are described herein. In a learning mode of operation, the mobile device performs a communication function in accordance with a communication protocol of the second RF transceiver. During performance of this function, the mobile device estimates the RF interference on a channel of the first RF transceiver and stores parameters which characterize the estimated RF interference in association with an identifier corresponding to the function. These actions are repeated for a plurality of channels of the first RF transceiver, as well as for a plurality of different communication functions of the second RF transceiver. In a communication mode of operation, when performing a communication function again, the mobile device receives an identifier associated with the function and retrieves the stored parameters corresponding to the received identifier. The mobile device applies the retrieved parameters to the first RF transceiver for reducing the adverse effect or impact of the RF interference during reception on the channel of the first RF transceiver.

Figure 1:
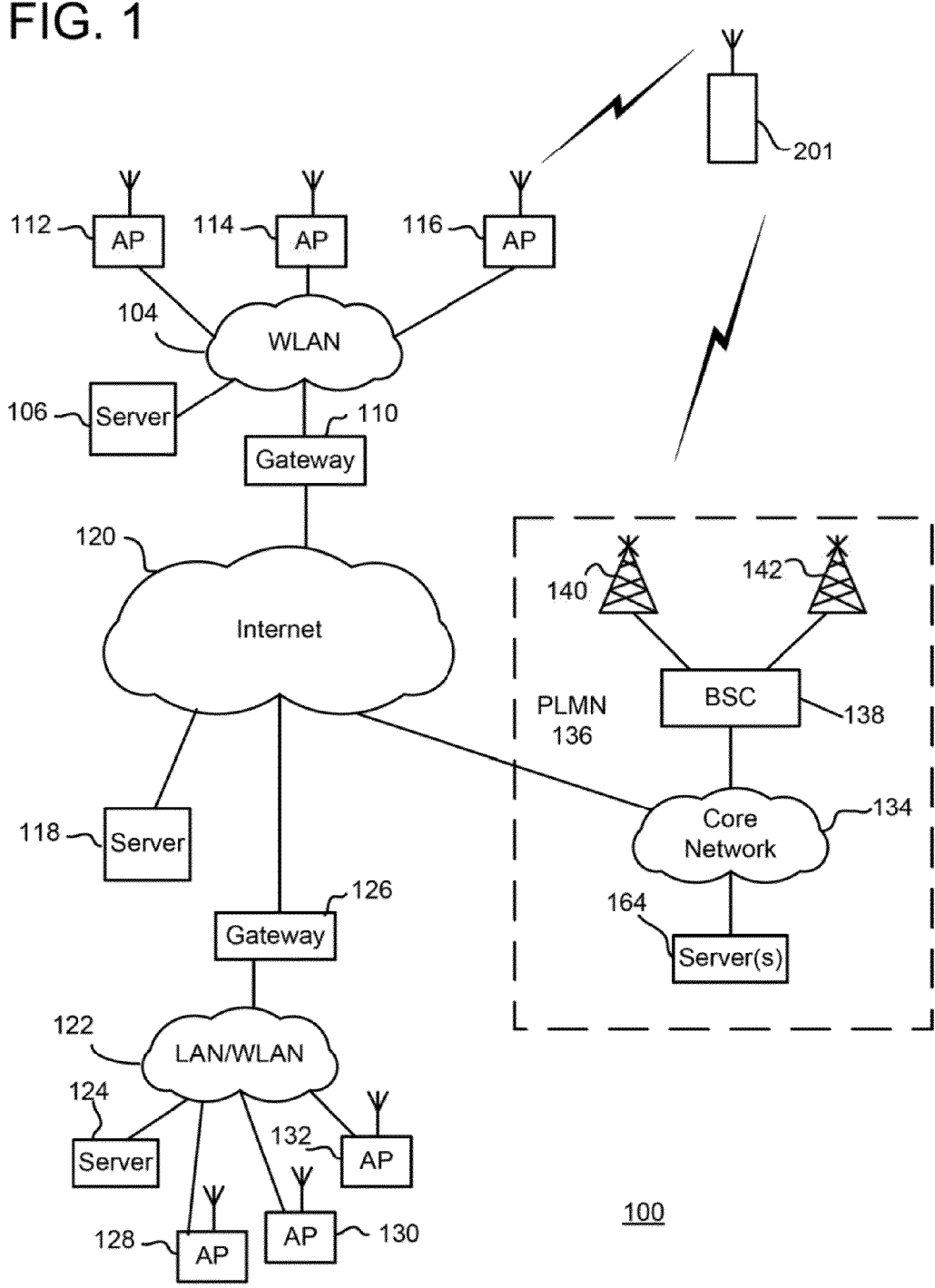
FIG. 1 is an illustrative representation of a communication system for a mobile communication device includes a first wireless network of a first type (e.g. IEEE 802.11 type) and a second wireless network of a second type (e.g. LTE® type)

Example Environment. To illustrate one environment within which the techniques of the present disclosure may be practiced, FIG. 1 illustrates a mobile communication device 201 which may communicate in a communication system 100. In the communication system 100, mobile device 201 may communicate with one or more wireless communication networks. For example, mobile device 201 may communicate with a wireless communication network 104 which is a wireless local area network (WLAN). Here, wireless network 104 and mobile device 201 may operate in accordance with IEEE 802.11 standards.

In this example, wireless network 104 has a plurality of wireless access points (APs) 112, 114, and 116 for wireless communications with mobile device 201. WLANs may be identified by a mobile device 201 with use of an identifier, which may be communicated from the WLAN. The wireless network identifier may be, for example, a Set Service Identifier (SSID) or Extended SSID (ESSID). In this example, wireless network 104 includes one or more servers 106, and a gateway 110. Server 106 may provide data, applications, and/or functionality for communication services for mobile device 201.

Wireless network 104 may be a public wireless local area network "hotspot" for public use, for example, a WI-FI® "hotspot" for public use, and include what may be referred to as a "captive portal" or "walled garden." For devices connected in wireless network 104 via one of wireless APs 112, 114, and 116, gateway 110 is configured to permit or deny access to the data, applications, and/or functionality, as well as to permit or deny external access outside of wireless network 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in wireless network 104 is made prior to proper authorization, gateway 110 is configured to redirect the request to a redirect server. In response, the redirect server is configured to respond to mobile device 201 to provide data for producing information (e.g. Web page information) which is rendered in a visual display of mobile device 201 via a Web browser application. The information may solicit a user response, such as a user registration or login with user fields for entering a user name and/or password information. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of wireless network 104.

Mobile device 201 may also operate for communications in other different wireless networks, such as a wireless network 122 which is also a WLAN. In this example, wireless network 122 is a private communication network of an enterprise (e.g. an organization, a company, a corporation, etc.) of mobile device 201. Similar to wireless network 104, wireless network 122 has a plurality of wireless APs 128, 130 and 132, one or more servers 124, and a gateway 126. For devices connected in wireless network 122 via one of wireless APs 128, 130, and 132, gateway 126 may be configured to permit or deny access to the data, applications, and/or functionality offered via wireless network 122 depending on whether or not a device has been authorized and what access rights are given upon authorization. For devices attempting to access wireless network 122 via Internet 120, gateway 126 is configured to permit or deny internal access to the data, applications, and/or functionality in wireless network 122.

Such wireless networks (e.g. infrastructure WLANs) may provide or allow access to various data and communication services to its terminals. For example, the wireless networks may provide for communication access to Internet 120 via the Web browser application, or voice telephony communication service with use of Voice over IP (VoIP) communication, or other communication services. For "push-type" data or message synchronization services, for example, mobile device 201 may be enabled to maintain data synchronization with a server (e.g. server 106 or 118) for user data of an application associated with a user account. The application of mobile device 201 and the server may be or include, for example, an electronic mail (e-mail) application program for the communication of e-mail messages.

Although the description relates to a specific example for illustration, where the wireless network or WLAN is an IEEE 802.11-based network, different environments may be applicable as well. The wireless network may be a wireless metropolitan area network, for example, a WIMAX® -based network (i.e. IEEE 802.16), or an Ultra-WideBand (UWB)-based network (i.e. IEEE 802.15), as a few examples.

Mobile device 201 may be additionally configured to access communication services via a Public Land Wireless Network (PLMN) 136 (e.g. a cellular telecommunications network). PLMN 136 includes a core network 134, a plurality of base station controllers such as a base station controller (BSC) 138 coupled to core network 134, and a plurality of base stations such as a base station (BS) 140 and a base station 142 coupled to associated BSCs 138. Core network 134, BSC 138, and BS 140 operate in a conventional fashion as well-documented. Other PLMNs in the environment have a similar or the same architecture as PLMN 136. For communication with PLMNs, such mobile device 201 may be configured in accordance with one or more cellular telecommunication standards, such as Long-Term Evolution (LTE) technology standards. Other technologies may be deemed suitable, such as Enhanced Data rates for GSM Evolution (EDGE) or Enhanced GPRS (EGPRS), Universal Mobile Telecommunications System (UMTS), or EVolution-Data Only (EV-DO) (for CDMA) technologies, as a few examples.

Figure 2:
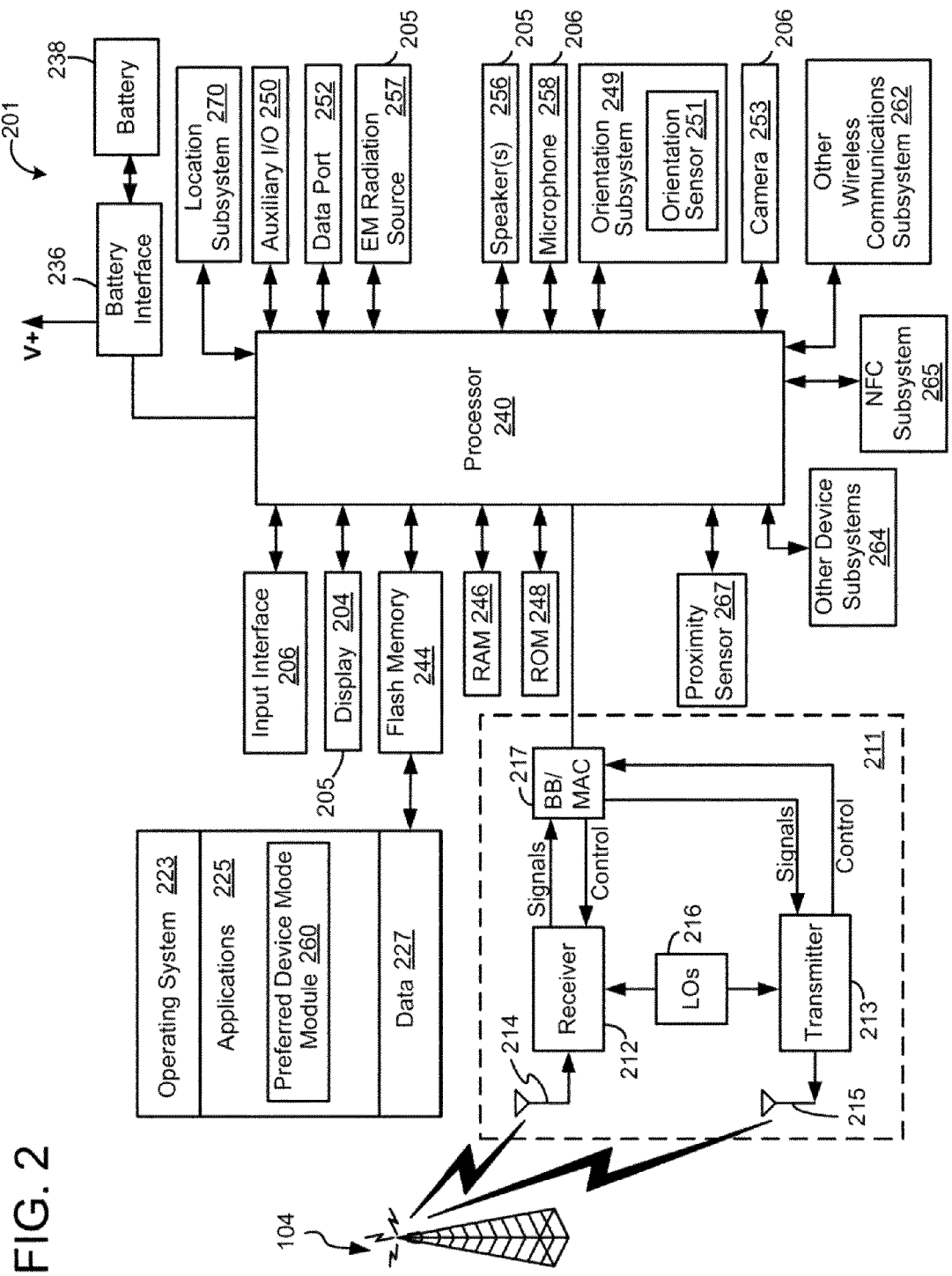
FIG. 2 is an example of a block diagram of n example of a mobile communication device.

Reference will now be made to FIG. 2 which illustrates one example of a block diagram of mobile device 201 in which example embodiments may be applied. In the illustrated example embodiment, mobile device 201 is a communication device and, more particularly, is a mobile communication device having data and voice communication capabilities, and configured to communicate with other computer systems (e.g. via the Internet). It will, however, be appreciated that mobile device 201 may take other forms.

Depending on the functionality provided by mobile device 201, in various example embodiments mobile device 201 may be a multiple-mode communication device configured for both data and voice communication, a mobile telephone, such as a smartphone, a wearable computers such as a watch, a tablet computer such as a slate computer, a personal digital assistant (PDA), or a computer system. Mobile device 201 may take other forms apart from those specifically listed above. The electronic device may also be referred to as a mobile communications device, a communication device, a mobile device and, in some cases, as a device.

Mobile device 201 includes a controller including one or more processor 240 (such as a microprocessor) which controls the overall operation of mobile device 201. The processor 240 interacts with device subsystems such as a wireless communication subsystem 211 for exchanging radio frequency signals with wireless network 104 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, and other device subsystems generally designated as 264. Some of the subsystems shown in FIG. 2 perform communication-related functions, whereas other subsystems may provide "resident" or on-device functions.

In at least some example embodiments, mobile device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some example embodiments, the touch-sensitive overlay may have a touch-sensitive input surface which is larger than the display 204. For example, in at least some example embodiments, the touch-sensitive overlay may extend overtop of a frame 312 (of FIG. 4) which surrounds the display 204. In such example embodiments, the frame 312 (of FIG. 4) may be referred to as an active frame since it is capable of acting as an input interface 206. In at least some example embodiments, the touch-sensitive overlay may extend to the sides of mobile device 201.

As noted above, in some example embodiments, mobile device 201 may include a communication subsystem 211 which allows mobile device 201 to communicate via wireless network 104. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to mobile device 201 and a single antenna may be shared by both receiver and transmitter. The particular design of the wireless communication subsystem 211 depends on wireless network 104 in which mobile device 201 is intended to operate.

In at least some example embodiments, mobile device 201 may communicate with any one of a plurality of stations or access points (APs) of wireless network 104 within its geographic coverage area. Mobile device 201 may send and receive communication signals over wireless network 104 after the required network registration or activation procedures have been completed. Signals received by the antenna 214 through wireless network 104 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to wireless network 104 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

Mobile device 201 may also include another wireless communication subsystem 262. Communication subsystem 262 may be, for example, a wireless transceiver or radio configured for communications in accordance with cellular communication technologies, such as LTE® technologies. The wireless network with which communication subsystem 262 interacts may be a second wireless network of a second type which is different from the wireless network of the first type. Communication subsystem 262 may operate for wireless communications in a manner generally similar to communication subsystem 211.

In some example embodiments, the auxiliary input/output (I/O) subsystems 250 may include an external communication link or interface; for example, an Ethernet connection. Mobile device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on mobile device 201 such as receipt of an electronic communication or incoming phone call, or for other purposes such as haptic feedback (touch feedback).

The data port 252 may be used for synchronization with a user's host computer system (not shown). The data port 252 enables a user to set preferences through an external device or software application and extends the capabilities of mobile device 201 by providing for information or software downloads to mobile device 201 other than through wireless network 104. The alternate download path may for example, be used to load an encryption key onto mobile device 201 through a direct, reliable and trusted connection to thereby provide secure device communication.

In at least some example embodiments, mobile device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of mobile device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

Mobile device 201 may, in at least some example embodiments, include a near field communications (NFC) subsystem 265. The NFC subsystem 265 is configured to communicate with other wireless devices 201 and/or tags, using an NFC communications protocol. NFC is a set of short-range wireless technologies which typically require a very short distance (e.g. 4 cm or less) for communications. The NFC subsystem 265 may include an NFC chip and an NFC antenna.

Mobile device 201 may include a microphone and/or one or more speakers. In at least some example embodiments, mobile device 201 may include a plurality of speakers 256. For example, in some example embodiments, mobile device 201 may include two or more speakers 256. The two or more speakers 256 may, for example, be disposed in spaced relation to one another. That is, in at least some example embodiments, mobile device 201 may include a first speaker and a second speaker and the first speaker and the second speaker may be spatially separated from one another within mobile device 201. In at least some example embodiments, the display 204 may be disposed between the first speaker and the second speaker of the electronic device. In such example embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some example embodiments, each speaker 256 may be associated with a separate audio channel. The multiple speakers may, for example, be used to provide stereophonic sound (which may also be referred to as stereo).

Mobile device 201 may also include one or more cameras 253. The one or more cameras 253 may be capable of capturing images in the form of still photographs or motion video. In at least some example embodiments, mobile device 201 includes a front facing camera 253. A front facing camera is a camera which is generally located on a front face of mobile device 201. The front face is typically the face on which a display 204 is mounted. That is the display 204 is configured to display content which may be viewed from a side of mobile device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of mobile device 201 and/or the housing of mobile device 201. In such example embodiments, the direction of capture of the camera is always predictable relative to the display 204 and/or the housing. In at least some example embodiments, the camera may be provided in a central location relative to the display 204 to facilitate image acquisition of a face.

In at least some example embodiments, mobile device 201 includes an electromagnetic (EM) radiation source 257. In at least some example embodiments, the EM radiation source 257 is configured to emit electromagnetic radiation from the side of the electronic device which is associated with a camera 253 of that mobile device 201. For example, where the camera is a front facing camera 253, mobile device 201 may be configured to emit electromagnetic radiation from the front face of mobile device 201. That is, in at least some example embodiments, the electromagnetic radiation source 257 is configured to emit radiation in a direction which may visible by the camera. That is, the camera 253 and the electromagnetic radiation source 257 may be disposed on mobile device 201 so that electromagnetic radiation emitted by the electromagnetic radiation source 257 is visible in images obtained by the camera.

In some example embodiments, the electromagnetic radiation source 257 may be an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

In some example embodiments, mobile device 201 is provided with a service routing application programming interface (API) which provides an application with the ability to route traffic through a serial data (i.e., USE) or Bluetooth® (Bluetooth® is a registered trademark of Bluetooth SIG, Inc.) connection to a host computer system using standard connectivity protocols. When a user connects their mobile device 201 to the host computer system via a USB cable or Bluetooth® connection, traffic that was destined for wireless network 104 is automatically routed to mobile device 201 using the USB cable or Bluetooth® connection. Similarly, any traffic destined for wireless network 104 is automatically sent over the USB cable or Bluetooth® connection to the host computer system for processing.

Mobile device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in mobile device 201, and the battery interface 236 provides a mechanical and electrical connection for the battery 238. The battery interface 236 is coupled to a regulator (not shown) which provides a regulated voltage V to the circuitry for powering mobile device 201.

Mobile device 201 stores data 227 in an erasable persistent memory, which in one example embodiment is the flash memory 244. In various example embodiments, the data 227 includes service data including information required by mobile device 201 to establish and maintain communication with wireless network 104. The data 227 may also include user application data such as email messages, address book and contact information, calendar and schedule information, notepad documents, image files, and other commonly stored user information stored on mobile device 201 by its user, and other data. The data 227 stored in the persistent memory (e.g. flash memory 244) of mobile device 201 may be organized, at least partially, into one or more databases or data stores. The databases or data stores may contain data items of the same data type or associated with the same application. For example, email messages, contact records, and task items may be stored in individual databases within the device memory.

Mobile device 201 may provide two principal modes of communication: a data communication mode and a voice communication mode. The communications make use of communication subsystem 211, communication subsystem 262, or both. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of mobile device 201 may also compose data items, such as email messages, for example, using the input devices in conjunction with the display 204. These composed items may be transmitted through the communication subsystem 211 or 262 over the wireless network.

In the voice communication mode, mobile device 201 provides voice telephony functions. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on mobile device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules stored in memory such as persistent memory; for example, in the flash memory 244. As illustrated in FIG. 2, the software modules include operating system software 223 and other software applications 225 such as preferred device mode module 260. In the example embodiment of FIG. 2, the preferred device mode module 260 is implemented as a stand-alone application 225. However, in other example embodiments, the preferred device mode module 260 could be implemented as part of the operating system 223 or another application 225.

The software applications 225 on mobile device 201 may also include a range of additional applications, including for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on mobile device 201 during or after manufacture. Additional applications and/or upgrades to the operating system 223 or software applications 225 may also be loaded onto mobile device 201 through wireless network 104, the auxiliary I/O subsystem 250, the data port 252, or other suitable subsystem 264. The downloaded programs or code modules may be permanently installed; for example, written into the program memory (i.e. the flash memory 244), or written into and executed from the RAM 246 for execution by the processor 240 at runtime.

Example Smartphone Electronic Device. Referring now to FIG. 3, a front view of an example mobile device 201 which is a smartphone 100 is illustrated. The smartphone 100 is a mobile phone which offers more advanced computing capability than a basic non-smartphone cellular phone. For example, the smartphone 100 may have the ability to execute third party applications which are stored on the smartphone.

The smartphone 100 may include the components discussed above with reference to FIG. 2 or a subset of those components. The smartphone 100 includes a housing 294 which houses at least some of the components discussed above with reference to FIG. 2.

In the example embodiment illustrated, the smartphone includes a display 204, which may be a touchscreen display which acts as an input interface 206. The display 204 is disposed within the smartphone 100 so that it is viewable at a front side 292 of the smartphone 100. That is, a viewable side of the display 204 is disposed on the front side 292 of the smartphone. In the example embodiment illustrated, the display 204 is framed by the housing 294.

The example smartphone 100 also includes other input interfaces 206 such as one or more buttons, keys or navigational input mechanisms. In the example illustrated, at least some of these additional input interfaces 206 are disposed for actuation at the front side 292 of the smartphone.

The example smartphone also includes a speaker 256. In the example embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the example smartphone 100 of FIG. 3 includes a single speaker 256, in other example embodiments, the smartphone 100 may include a greater number of speakers 256. For example, in at least some example embodiments, the smartphone 100 may include a second speaker 256 which is disposed vertically below the display 204 when the smartphone is held in a portrait orientation where its height is longer than its width (i.e. the orientation illustrated in FIG. 3).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of and/or surrounding the front side of the smartphone 100.

The example smartphone 100 also includes an electromagnetic radiation source 257. The electromagnetic radiation source 257 is disposed on the front side 292 of the smartphone 100. In this orientation, electromagnetic radiation which is produced by the electromagnetic radiation source 257 may be projected onto objects which are located in front of and/or surrounding the front side of the smartphone 100. Such electromagnetic radiation (or the projection of electromagnetic radiation onto objects) may be captured on images obtained by the camera 253.

Example Tablet Electronic Device. The wireless device may be a tablet computer 300 ("tablet"), one of which is illustrated in FIG. 4. Tablet computer 300 of FIG. 4 may include many of the same features and components of the smartphone 100 of FIG. 3. However, tablet computer 300 of FIG. 3 is generally larger than the smartphone 100 of FIG. 3. Tablet computer 300 may include the components discussed above with reference to FIG. 2 or a subset of those components. Tablet computer 300 includes a housing 394 which houses at least some of the components discussed above with reference to FIG. 2.

Tablet computer 300 includes a display 304, which may be a touchscreen display which acts as an input interface 206. The display 304 is disposed within tablet computer 300 so that it is viewable at a front side 302 of tablet computer 300. That is, a viewable side of the display 304 is disposed on the front side 302 of tablet computer 300. In the example embodiment illustrated, the display 304 is framed by the housing 394, with use of a frame 312 which surrounds the display 304. The frame 312 is portion of the housing 394 which provides a border around the display 304. In at least some example embodiments, the frame 312 is an active frame 312. That is, the frame has a touch sensitive overlay which allows mobile device 201 to detect a touch applied to the frame, thereby allowing the frame 312 to act as an input interface 206.

The example tablet computer 300 includes a plurality of speakers 256. In the example embodiment illustrated, the tablet includes two speakers 256. The two speakers 256 are disposed on opposing sides of the display 304. More particularly, when tablet computer 300 is held in a landscape orientation (such as the orientation illustrated in FIG. 3) where its width is longer than its height, one of the two speakers is disposed on a right side 306 of the display 304 and one of the speakers is disposed on the left side 308 of the display 304. Both speakers 256 are disposed on the front side 302 of tablet computer 300.

The example tablet computer 300 also includes a microphone 258. In the example illustrated, the microphone 258 is vertically disposed below the display 304 when the tablet computer is held in the landscape orientation illustrated in FIG. 4. The microphone 258 may be located in other locations in other example embodiments.

The example tablet computer 300 also includes a front facing camera 253 which may be located vertically above the display 304 when tablet computer 300 is held in a landscape orientation (i.e. the orientation of FIG. 4). The front facing camera 253 is located so that it may capture images of objects which are located in front of and/or surrounding the front side of tablet computer 300.

The example tablet computer 300 also includes an electromagnetic radiation source 257. The electromagnetic radiation source 257 is disposed on the front side 304 of tablet computer 300. In this orientation, electromagnetic radiation which is produced by the electromagnetic radiation source 257 may be projected onto objects which are located in front of and/or surrounding the front side 302 of tablet computer 300. Such electromagnetic radiation (or the projection of electromagnetic radiation onto objects) may be captured on images obtained by the camera 253.

In environments requiring use of two or more co-located radios (e.g. IEEE 802.11 and LTE® radios contained within the same mobile device) utilizing adjacent RF bands, there is a need for ensuring that communications are not hindered due to RF interference from their simultaneous use.

Figure 5:
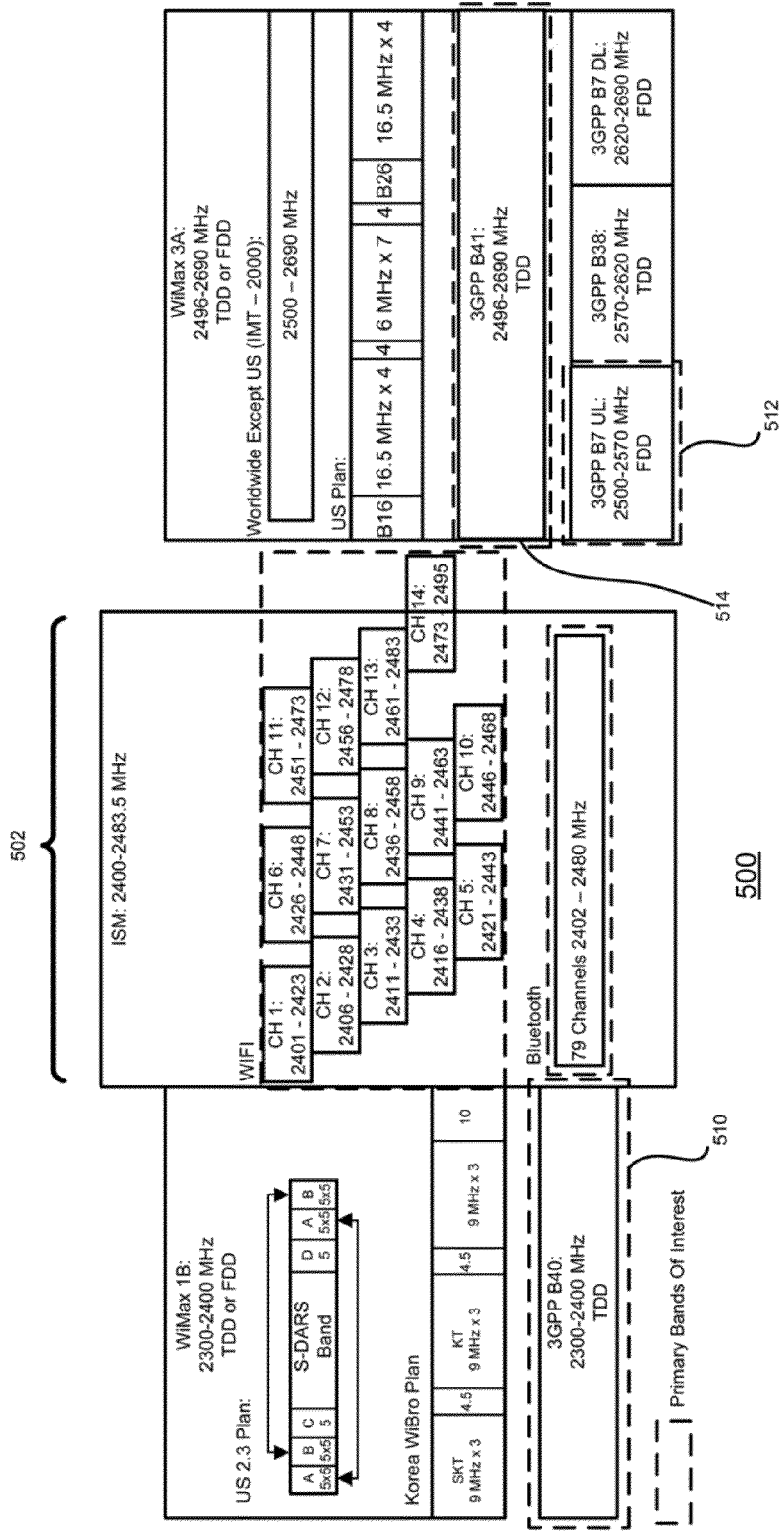
FIG. 5 is a diagram of a frequency spectrum 500 which shows a first radio frequency (RF) band for communication using the first RF transceiver, and a second RF band for communication using the second RF transceiver, the second RF band being adjacent to the first RF band.

To better illustrate, FIG. 5 is a diagram of a frequency spectrum 500 which shows a first radio frequency (RF) band 502 for communication in the first wireless network of the first type (e.g. WLAN or 802.11type) and a second RF band 510, 512, or 514 for communications in the second wireless network of the second type (e.g. LTE® type). As revealed in the diagram, any one of second RF bands 510, 512, or 514 of the second type is adjacent to the first RF band 502. Communications in the first RF band 502 may be interfered by communications with the second wireless network in second RF band 510, 512, or 514, if no special techniques are employed in relation to the mobile device.

Figure 6:
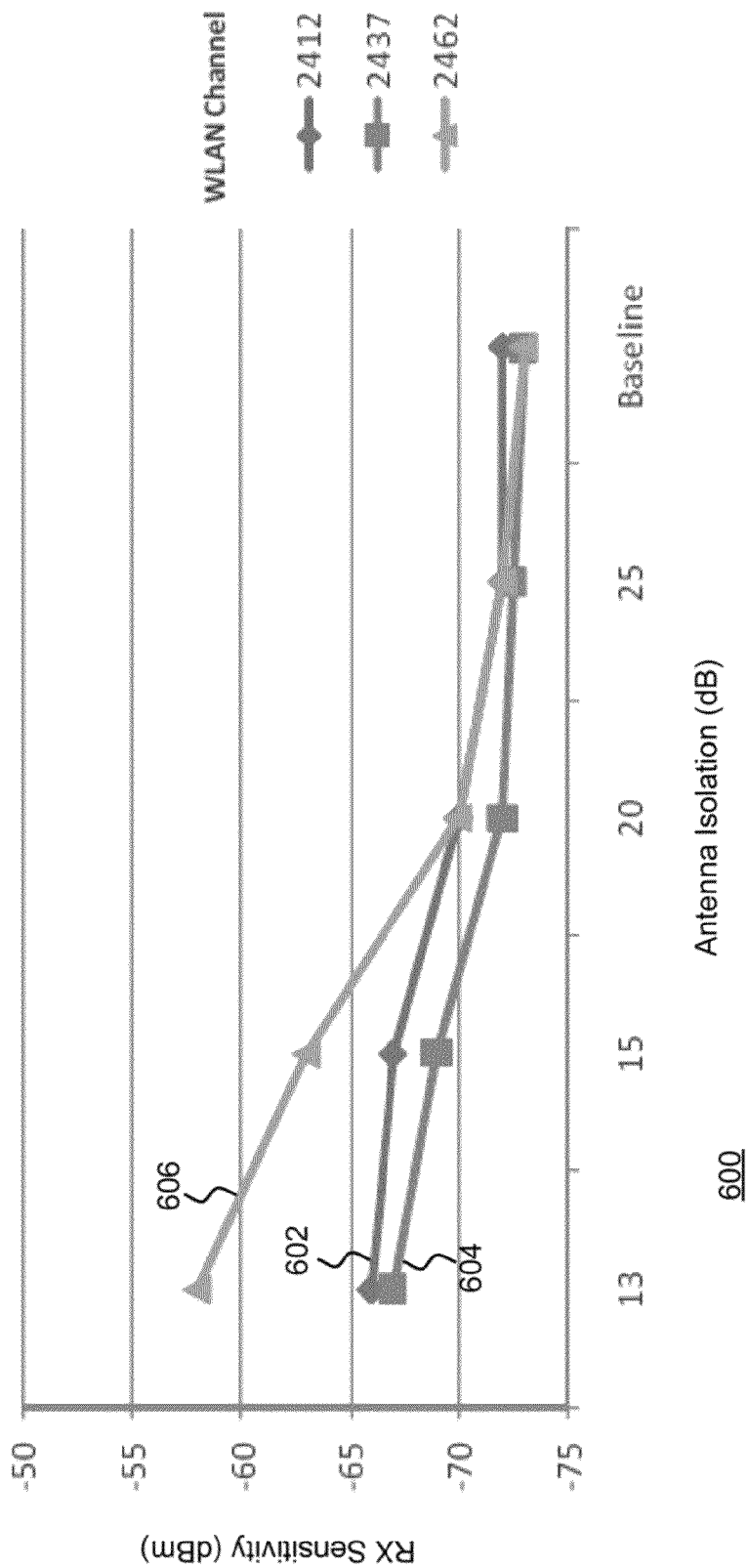
FIG. 6 is a graph showing a relationship between receiver sensitivity versus antenna isolation associated with the first RF transceiver, where interference is produced by the second RF transceiver.

In particular with respect to using both WLAN and LTE® , it has been observed that LTE® transmissions degrade the performance of a co-located WLAN radio receiver due to out-of-band leakage and adjacent channel interference. Some of this may be attributed to the non-linear behavior of the receiver in the adjacent band. To illustrate, FIG. 6 is a graph 600 of different relationships 602, 604, and 606 between receiver sensitivity and antenna isolation for different WLAN channels, where interference is produced by the co-located LTE® a radio. In particular, graph 600 reveals the loss in receiver sensitivity as a function of antenna isolation during LTE®transmissions. LTE® "B7" radio (i.e. see second RF band 512) was set to 20 MHz (fc =2509 MHz) with 100 resource block allocation and output power of 22 dBm. As is apparent, the WLAN channel closest to the LTEa band (i.e. relationship 606 of FIG. 6, channel 2462) suffers 15 dB of desense with a typical LTEa-to-WLAN antenna isolation of 13 dB. This degradation is measured at an LTE® output power of 22 dBm, but is expected to be greater at the maximum LTE® output power of 24 dBm.

Referring ahead to FIGS. 8 and 9, what are shown are flowcharts for describing methods in a mobile communication device for use in reducing the adverse effect or impact of the RF interference previously described. More particularly, FIG. 8 corresponds to a method of processing for a first RF transceiver (e.g. communication subsystem 211 of FIG. 2) of the mobile device, and FIG. 9 corresponds to a corresponding method of processing for a second RF transceiver (e.g. communication subsystem 262 of FIG. 2) of the mobile device. Communications using the first RF transceiver are performed within a first RF band, and communications using the second RF transceiver are performed in a second RF band which is adjacent to the first RF band. In the flowcharts of FIGS. 8-9, processing for the first and the second RF transceivers is performed in accordance with a learning mode of operation. The methods will be described with reference to the flowcharts of FIGS. 8-9 in combination.

Beginning at a start block 802 of FIG. 8, processing for the first RF transceiver identifies whether the first wireless network is new, that is, communications are being performed in relation to a newly-encountered first wireless network and/or access point (step 804 of FIG. 8). If "no" at step 804, then the processing continues to monitor for such condition. On the other hand, if "yes" at step 804, then the learning mode of operation is initiated for the first RF transceiver (step 806 of FIG. 8), the learning mode of operation being described in the further steps of the flowcharts. In general, in the learning mode of operation, the mobile device will "learn" the RF interference present on one or more channels of the first RF transceiver which is caused by different communication functions being performed using the second RF transceiver.

Processing for the second RF transceiver receives an indication to start the learning mode of operation (step 904 of FIG. 9) and, in response, starts the learning mode of operation (step 906 of FIG. 9). In this step, processing for the first RF transceiver may send an instruction or command to the processing for the second RF transceiver, where the instruction or command indicates that the learning mode of operation for the second RF transceiver will commence.

Processing for the first RF transceiver then identifies one or more channels in the first RF band that need to be assessed for RF interference from use of the second RF transceiver (step 808 of FIG. 8). All of the valid channels in the first RF band may be identified for assessment in this step. On the other hand, only some the channels in the first RF band may need to be assessed for RF interference. For example, some channels in the first RF band that are closer in frequency to the second RF band may need to be assessed, whereas other channels in the first RF band that are further in frequency from the second RF band may not. As another example, some channels in the first RF band may need to be assessed, whereas other channels in the first RF band may not need to be assessed as the assessment of the other channels is the same or similar to them, and may be similarly applied. As a further example, only the single channel that has been (previously) used with the specific access point may need to be assessed.

Processing for the second RF transceiver then identifies one of a plurality of communication functions to be performed using the second RF transceiver (step 908 of FIG. 9). Processing for the first RF transceiver also identifies this particular communication function to be performed (step 810 of FIG. 8). For example, the communication function may be a resource block allocation function, a resource block offset function, an index function, a transmit power function, or other predetermined function. Each one of these functions is associated with a known protocol (e.g. of the adopted communication standard) associated with the second RF transceiver.

Here, processing for the second RF transceiver may send a message, instruction, or command to the processing for the first RF transceiver, where the message, instruction, or command includes an identifier which identifies the particular communication function which will be performed. Alternatively, processing for the first. RF transceiver may send a message, instruction, or command to the processing for the second RF transceiver, where the message, instruction, or command includes an identifier which identifies the particular communication function to be performed by the second RF transceiver. Also alternatively, a central processor may control and communicate with both communication subsystems, where the communication subsystems do not communicate with each other at least for these purposes.

Figure 7:
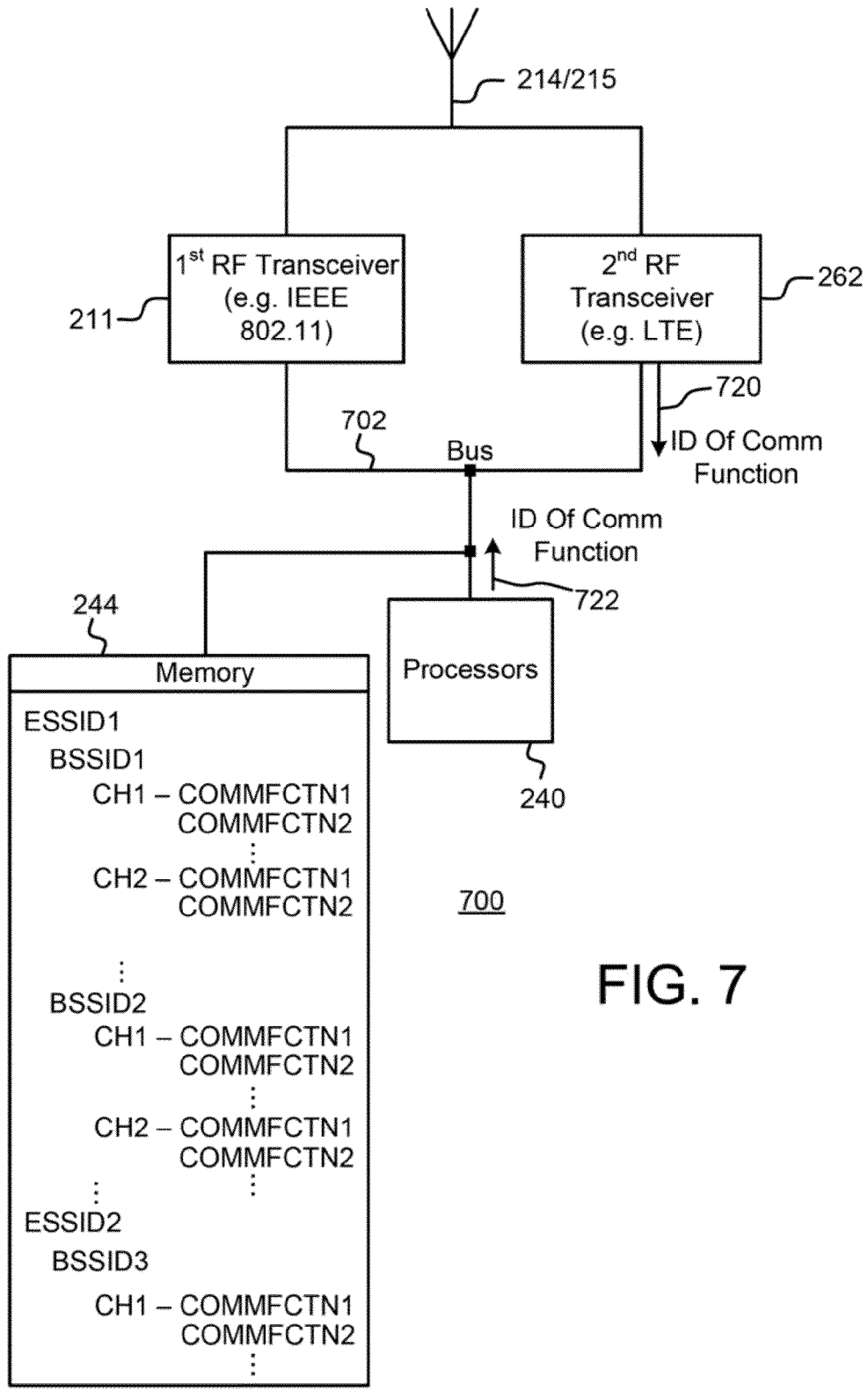
FIG. 7 is a simplified block diagram showing the first and the second RF transceivers and the one or more processors associated therewith according to the present disclosure.

In relation to step 810 and step 908, see e.g. the block diagram 700 of FIG. 7 which shows both communication subsystems 211 and 262 and the one or more processors 240 associated therewith. A message, instruction, or command 720 which includes the identifier of the communication function may be sent from second RF transceiver 262 on a communication bus 702. On the other hand, a message, instruction, or command 722 which includes the identifier of the communication function may be sent from one or more processors 240 on communication bus 702.

Referring back to FIGS. 8-9, processing for the first RF transceiver then selects the (first) channel to be assessed for RF interference (step 812 of FIG. 8). Processing for both the first and the second RF transceivers will then delay until it is time to simultaneously commence the process. Processing for the second RF transceiver delays to perform the communication function (step 910 of FIG. 9), while processing for the first RF transceiver delays to perform an estimate of the RF interference on the selected channel which is caused by the performance of the communication function (step 814 of FIG. 8). Simultaneous initiation of both processes may be achieved by communicating a trigger signal, or alternatively by setting and including a time for commencement in the command or instruction communicated between the first and the second RF transceivers in steps 810 and 908.

At the appropriate time, processing for the second RF transceiver initiates the performance of the communication function involving the second RF transceiver (step 912 of FIG. 9). The communication function is performed in accordance with a communication protocol of the second RF transceiver, where the communications are performed in the second RF band. At the same time, processing for the first RF transceiver performs an estimation of the RF interference on the channel in the first RF band, which is caused by the performance of the communication function using the second RF transceiver operating in the second RF band (step 816 of FIG. 8). This estimation may be an estimation of the noise power spectrum on the channel.

These processes will continue until they are completed (step 818 of FIG. 8, step 914 of FIG. 9), which will generally be dictated by the length of time to complete the communication function. Ceasing of the estimation process in step 818 of FIG. 8 may be achieved by communicating a trigger signal upon the end of the performance of the communication function. Alternatively, ceasing of the estimation process in step 818 may be achieved by setting a time for ceasing the process (i.e. which may be known in advance), for example, in a message, command, or instruction communicated between the first and the second RF transceivers (e.g. steps 810 and 908).

Once the estimation is done at step of 818 of FIG. 8, processing for the first RF transceiver stores, in memory, parameters that characterize the estimated RF interference (step 820 of FIG. 8). These parameters are stored in association with the identifier of the communication function, as well in association with an identifier of the channel (e.g. channel number). Note that this information may be further stored in association with an identifier of the access point (e.g. BSSID), and an identifier of the network (e.g. SSID or ESSID).

See e.g. again the schematic block diagram 700 of FIG. 7, which shows memory 244 having the relevant information stored therein. Advantageously, the stored parameters will be readily accessible for use during the communication mode of operation (see discussion below in relation to FIG. 10).

Processing for the first RF transceiver then identifies whether there are more channels of the access point to be assessed (step 822 of FIG. 8). If "yes" at step 822, then the processing repeats back at step 812 to identify or select the next channel and again perform the estimation at step 816 as previously described. Processing for the second RF transceiver similarly repeats its processing for the next channel (step 916 of FIG. 9).

If "no" at steps 822 and step 916, where all relevant channels for the access point have been assessed, then processing for the first and the second RF transceivers identify if there are additional communication functions of the second RF transceiver to be performed (step 824 of FIG. 8, step 918 of FIG. 9). If there are additional communication functions to perform as identified at steps 824 and 918, then the processing identifies or selects the next communication function of the second RF transceiver (step 810 of FIG. 8, step 908 of FIG. 9). For example again, the next communication function may be a resource block allocation function, a resource block offset function, an index function, a transmit power function, etc.

As stated previously, processing for the second RF transceiver may send a next message, instruction, or command to the processing for the first RF transceiver, where the next message, instruction, or command includes a next identifier which identifies the next particular communication function which will be performed. Alternatively, processing for the first RF transceiver may send a next message, instruction, or command to the processing for the second RF transceiver, where the next message, instruction, or command includes a next identifier which identifies the next particular communication function to be performed by the second RF transceiver. Also alternatively, a central processor may control and communicate with both communication subsystems, where the communication subsystems do not communicate with each other at least for these purposes.

Thus, the second RF transceiver will perform the next communication function at step 912 of FIG. 9 while processing for the first RF transceiver performs an estimation of the RF interference on the selected channel (selected in step 812) at step 816 of FIG. 8. Once the estimation is done at step of 818 of FIG. 8, processing for the first RF transceiver stores parameters that characterize the estimated RF interference at step 820 of FIG. 8. Again, the parameters are stored in association with the next identifier of this next communication function, as well in association with an identifier of the channel (e.g. channel number), as previously described.

The process repeats for additional channels as identified in step 822, as well as any additional communication functions as identified in step 824. The process of FIG. 8 ends at an end block 826 of FIG. 8, and the process of FIG. 9 ends at an end block 920 of FIG. 9.

Figure 11:
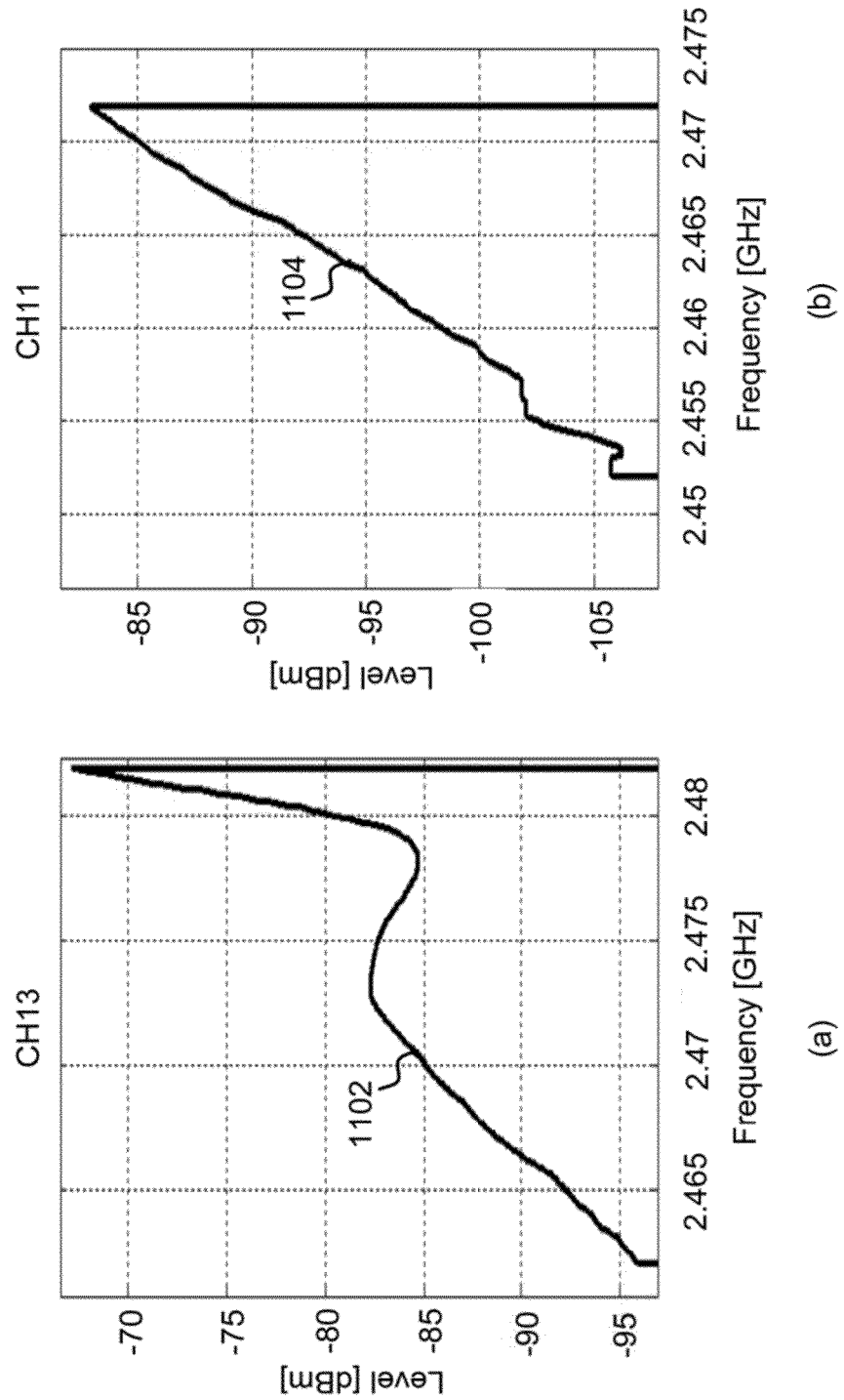
FIGS. 11(a)-11(b) are graphs of examples of power noise spectrums of RF interference on two different channels of the first RF transceiver while performing a communication function of the second RF transceiver.

Again, an estimation of the RF interference on the channel in the first RF band is produced in step 816, which may be an estimation of the noise power spectrum on the channel. Referring briefly to FIGS. 11($a$)-11($b$), what are shown are graphs of examples of power noise spectrum curves 1102 and 1104 of RF interference on two different IEEE 802.11 channels (e.g. channels 13 and 11, respectively). It has been observed that curve 1102 may be approximated by a function of $3^{rd}$ order, whereas curve 1104 may be approximated by a function of $1^{st}$ order. As is apparent, parameters of these curves 1102 and 1104 may be stored as the parameters in step 820. Note further that a reduced subset of points may be stored where tie missing points in between are interpolated.

Figure 10:
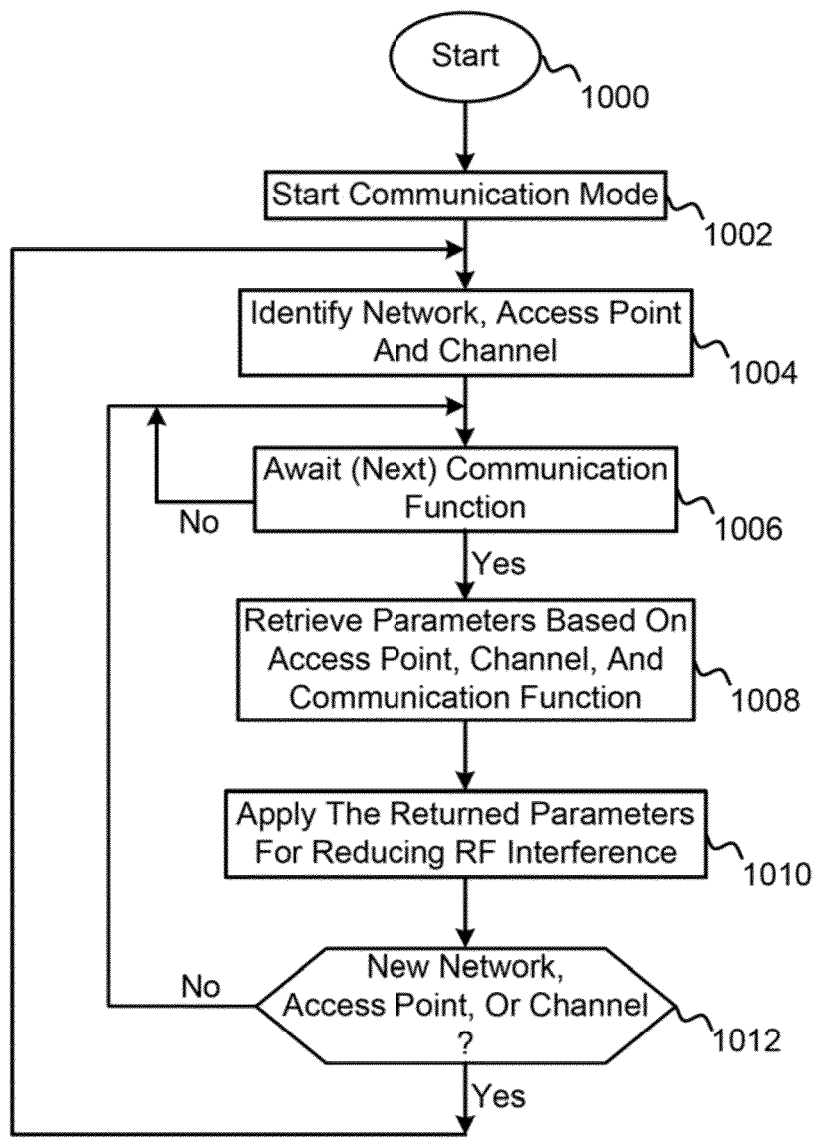
FIG. 10 is a flowchart for describing a method for use in reducing the effect of RF interference during a communication mode of operation of the mobile device.

FIG. 10 is a flowchart for describing a method for use in reducing the adverse effect or impact RF interference during a communication mode of operation of the first RF transceiver. The communication mode of operation for the first RF transceiver may be performed subsequent to the learning mode of operation described in relation to FIGS. 8-9. Alternatively, one or more learning modes of operation may be performed in between communication modes of operation (e.g. during otherwise idle times of operation).

Beginning at a start block 1000 of FIG. 10, processing for the first RF transceiver identifies or initiates operation in accordance with the communication mode of operation (step 1002 of FIG. 10). In the communication mode of operation, the mobile device is generally maintaining communications via an access point of a wireless network using the first RF transceiver. Processing for the first RF transceiver identifies the selected wireless network (e.g. by SSID or ESSID), the access point that is currently associated with (e.g. by BSSID), and the channel of operation of the access point (step 1004 of FIG. 10).

Communication processing for the first RF transceiver is performed normally until it is identified that one of the communication functions using the second RF transceiver will be performed (step 1006 of FIG. 10). Processing for the second RF transceiver may, for example, send a message, instruction, or command to processing for the first RF transceiver, where the message, instruction, or command includes an identifier which identifies the particular communication function which will be performed.

When the communication function is identified at step 1006, processing for the first RF transceiver retrieves from memory stored parameters which characterize RF interference associated therewith (step 1008 of FIG. 10). The stored parameters are retrieved based on the identifier of the access point, the identifier of the channel, and the identifier of the communication function. Processing for the first RF transceiver then applies these retrieved parameters to the first RF transceiver, for reducing the adverse effect or impact of RF interference during reception on the channel of the first. RF transceiver (step 1010 of FIG. 10). Processing repeats back at step 1004 upon identifying that a new channel, a new access point, and/or a new network has be selected (step 1012 of FIG. 10).

Figure 12:
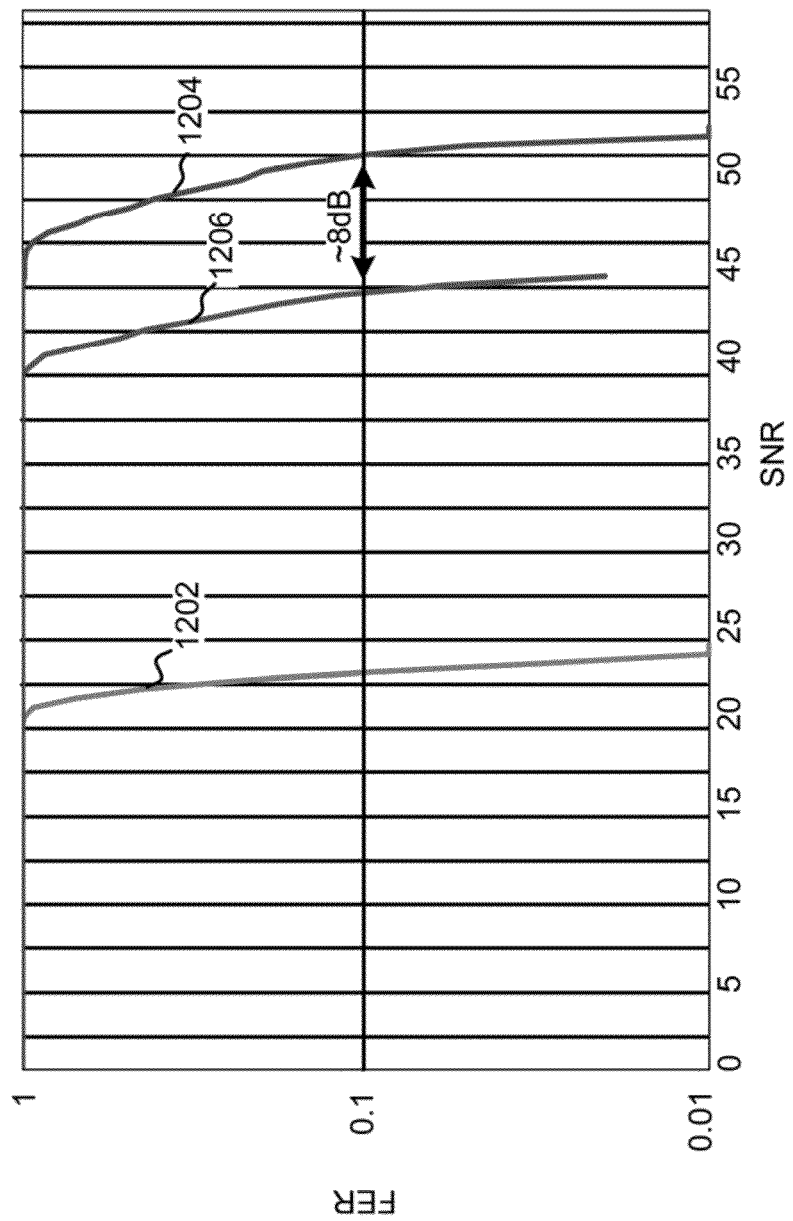
FIG. 12 is a graph showing relationships associated with the first RF transceiver from non-use and use of techniques of the present disclosure.

FIG. 12 is a graph 1200 showing examples of curves 1202, 1204, and 1206 of the signal-to-noise ratio (SNR) versus frame error rate (FER) of the first RF transceiver from non-use and use of techniques of the present disclosure. The receiver sensitivity of the first RF transceiver may be viewed as the received signal power that is is needed to achieve a particular FER (e.g. 10%). Note that SNR is proportional to the received signal power. Curve 1202 is associated with the FER of the first. RF transceiver without any RF interference from the second RF transceiver (22.5 dB, when the FER is 10%). On the other hand, curve 1204 is associated with the FER of the first RF transceiver with RF interference from the second RF transceiver (desensed by 30 dB). Curve 1206 is associated with the FER of the first RF transceiver with RF interference from the second RF transceiver, but with use of techniques of the present disclosure (desensed only by 21.5 dB, accounting for an 8 dB difference). Depending on the receiver operating point, the techniques of the present disclosure may increase the data rate by a factor of 2 or 3. Note that the expected gain in actual practice may be lower than that noted, due to its dependency on the implementation of the noise estimation process.

Thus, techniques for reducing the adverse effect or impact of RF interference for a mobile device having first and second RF transceivers have been described. In a learning mode of operation, the mobile device performs a communication function in accordance with a communication protocol of the second RF transceiver. During performance of this function, the mobile device estimates the RF interference on a channel of the first RF transceiver and stores parameters which characterize the estimated RF interference in association with an identifier corresponding to the function. These actions are repeated for a plurality of channels of the first RF transceiver, as well as for a plurality of different communication functions of the second RF transceiver. In a communication mode of operation, when performing a communication function again, the mobile device receives an identifier corresponding to the function and retrieves stored parameters corresponding to the received identifier. The mobile device applies the retrieved parameters to the first RF transceiver for reducing the adverse effect or impact of the RF interference during reception on the channel of the first RF transceiver.

The above-described embodiments of the present disclosure are intended to be examples only. Those of skill in the art may affect alterations, modifications and variations to the particular embodiments without departing from the scope of the application. Although the description relates to specific examples for illustration, where the WLAN is an IEEE 802.11-based network, for example, different environments may be applicable as well. As a few other examples, the wireless networking may be based on a wireless metropolitan area network, for example, a WIMAX® network (i.e. IEEE 802.16), or an Ultra-WideBand (UWB) network (i.e. IEEE 802.15). The invention described herein in the recited claims intends to cover and embrace all suitable changes in technology.

What is claimed is:

1. A method in a mobile communication device for use in reducing the effect of interference, the mobile communication device comprising a first radio frequency (RF) transceiver operable in a first RF band and a second RF transceiver operable in a second RF band adjacent the first RF band, the method comprising:
   (i) for each channel of multiple channels to be assessed, the multiple channels belonging to the first RF band:
      performing a predetermined communication function using the second RF transceiver;
      estimating a noise power spectrum on a channel being assessed of the first RF transceiver during performance of the predetermined communication function; and
      storing parameters which characterize the estimated noise power spectrum in association with an identifier of the channel being assessed; and
   (ii) when performing the predetermined communication function again using the second RF transceiver:
      identifying the channel on which the first RF transceiver is currently operating;
      retrieving the stored parameters that were stored in associated with the identified channel which characterize the estimated noise power spectrum; and
      applying the retrieved parameters to the first RF transceiver during reception on the identified channel.

2. The method of claim 1, further comprising:
   when the predetermined communication function is to be performed, receiving an identifier of the predetermined communication function; and
   storing the parameters which characterize the estimated noise power spectrum in association with the identifier of the predetermined communication function.

3. The method of claim 2, further comprising:
when the predetermined communication function is to be performed again, receiving again the identifier of the predetermined communication function; and
wherein retrieving the stored parameters which characterize the estimated noise power spectrum comprises selecting the stored parameters from memory based on the received identifier of the predetermined communication function and based on the identified channel.

4. The method of claim 1, wherein the acts of performing, estimating, and storing are performed during a learning mode of operation, and the acts of identifying, retrieving and applying are performed during a communication mode of operation.

5. The method of claim 1, wherein the first RF transceiver is configured to communicate in the first RF band with a wireless local area network (WLAN).

6. The method of claim 1, wherein the second RF transceiver is configured to communicate in the second RF band with a Long Term Evolution (LTE) network.

7. The method of claim 1, which is embodied in a computer program product comprising a non-transitory computer readable medium and computer instructions stored in the non-transitory computer readable medium, the computer instructions being executable by one or more processors of the mobile device for performing the method.

8. A mobile communication device, comprising:
one or more processors;
a memory coupled to the one or more processors;
a first radio frequency (RF) transceiver coupled to the one or more processors, the first RF transceiver being operable in a first RF band;
a second RF transceiver coupled to the one or more processors, the second RF transceiver being operable in a second RF band adjacent the first RF band;
the one or more processors being configured:
(i) for each channel of multiple channels to be assessed, the multiple channels belonging to the first RF band:
to perform a predetermined communication function using the second RF transceiver;
to estimate a noise power spectrum on a channel being assessed of the first RF transceiver during performance of the predetermined communication function; and
to store, in the memory, parameters which characterize the estimated noise power spectrum in association with an identifier of the channel being assessed; and
(ii) when performing the predetermined communication function again using the second RF transceiver:
to identify the channel on which the first RF transceiver is currently operating;
to retrieve from the memory the stored parameters that were stored in associated with the identified channel which characterize the estimated noise power spectrum; and
to apply the retrieved parameters to the first RF transceiver during reception on the identified channel.

9. The mobile device of claim 8, wherein the one or more processors are further configured:
when the predetermined communication function is to be performed, to receive an identifier of the predetermined communication function; and
to store the parameters which characterize the estimated noise power spectrum in association with the identifier of the predetermined communication function.

10. The mobile device of claim 9, wherein the one or more processors are further configured:
when the predetermined communication function is to be performed again, to receive again the identifier of the predetermined communication function; and
to retrieve the stored parameters which characterize the estimated noise power spectrum by selecting the stored parameters from the memory based on the received identifier of the predetermined communication function and based on the identified channel.

11. The mobile device of claim 8, further comprising:
wherein the one or more processors operate the mobile device in a learning mode of operation for the actions of performing, estimating, and storing; and
wherein the one or more processors operate the mobile device in a communication mode of operation for the actions of identifying, retrieving and applying.

12. The mobile device of claim 8, wherein the first RF transceiver comprises a wireless local area network (WLAN) transceiver.

13. The mobile device of claim 8, wherein the second RF transceiver comprises a Long Term Evolution (LTE) transceiver.

14. A method in a mobile communication device for use in reducing the effect of interference, the mobile communication device comprising a first radio frequency (RF) transceiver operable in a first RF band and a second RF transceiver operable in a second RF band adjacent the first RF band, the method comprising:
(i) for each channel of multiple channels to be assessed, the multiple channels belonging to the first RF band:
performing a first predetermined communication function using the second RF transceiver;
estimating a first noise power spectrum on a channel being assessed of the first RF transceiver during performance of the first predetermined communication function;
storing first parameters which characterize the estimated first noise power spectrum in association with an identifier corresponding to the first predetermined communication function and in association with an identifier of the channel being assessed;
performing a second predetermined communication function using the second RF transceiver;
estimating a second noise power spectrum on the channel being assessed of the first RF transceiver during performance of the second predetermined communication function; and
storing second parameters which characterize the estimated second noise power spectrum in association with an identifier corresponding to the second predetermined communication function and in association with the identifier of the channel being assessed; and
(ii) responsive to identifying that the first predetermined communication function is again being performed using the second RF transceiver while the first RF transceiver is operative on an identified channel, retrieving the stored first parameters that were stored in association with the identified channel and applying the retrieved first parameters to the first RF transceiver during reception on the channel of the first RF transceiver; and
(iii) responsive to identifying that the second predetermined communication function is again being performed using the second RF transceiver while the first RF transceiver is operative on another identified channel, retrieving the stored second parameters that were stored in associated with the other identified channel and applying the retrieved second parameters to the first RF transceiver during reception on the channel of the first RF transceiver, wherein the first predetermined communication function differs from the second predetermined communication function.

15. The method of claim 14, wherein the first RF transceiver comprises a wireless local area network (WLAN) transceiver.

16. The method of claim 14, wherein the second RF transceiver comprises a Long Term Evolution (LTE) transceiver.

17. The method of claim 16, wherein the first predetermined communication function and the second predetermined communication function are selected from a group consisting of a resource block allocation function, a resource block offset function, and a transmit power function.

18. The method of claim 14, which is embodied in a computer program product comprising a non-transitory computer readable medium and computer instructions stored in the non-transitory computer readable medium, the computer instructions being executable by one or more processors of the mobile device for performing the method.

19. The method of claim 6, wherein the predetermined communication function is selected from a group consisting of a resource block allocation function, a resource block offset function, and a transmit power function.

20. The mobile device of claim 13, wherein the predetermined communication function is selected from a group consisting of a resource block allocation function, a resource block offset function, and a transmit power function.

* * * * *